United States Patent [19]

Anderson

[11] Patent Number: 4,538,832
[45] Date of Patent: Sep. 3, 1985

[54] ADJUSTABLE SEAT BELT ANCHORAGE

[75] Inventor: Alexander B. Anderson, Carlisle, England

[73] Assignee: ASE (UK) Limited, Carlisle, England

[21] Appl. No.: 466,066

[22] Filed: Feb. 14, 1983

[51] Int. Cl.³ .................. B60R 21/10; A62B 35/00
[52] U.S. Cl. .................. 280/808; 280/801; 297/480; 297/483
[58] Field of Search ............ 280/808, 801; 297/468, 297/470, 476, 480, 483

[56] References Cited

U.S. PATENT DOCUMENTS

| | | | |
|---|---|---|---|
| 3,964,798 | 6/1976 | Burleigh | 280/808 |
| 4,135,737 | 1/1979 | Scholz et al. | 280/808 |
| 4,225,185 | 9/1980 | Krzok | 280/801 |
| 4,373,748 | 2/1983 | Reid et al. | 297/480 |
| 4,398,749 | 8/1983 | Hipp et al. | 280/801 |
| 4,456,283 | 6/1984 | Michael et al. | 297/483 |
| 4,466,666 | 8/1984 | Takada | 297/483 |

FOREIGN PATENT DOCUMENTS

| | | |
|---|---|---|
| 7302459 | 3/1977 | Fed. Rep. of Germany . |
| 2625572 | 12/1977 | Fed. Rep. of Germany . |
| 2657819 | 6/1978 | Fed. Rep. of Germany . |
| 7821970 | 11/1978 | Fed. Rep. of Germany . |
| 7925896 | 2/1980 | Fed. Rep. of Germany . |
| 2932505 | 2/1981 | Fed. Rep. of Germany . |
| 2947391 | 5/1981 | Fed. Rep. of Germany . |
| 3005818 | 10/1981 | Fed. Rep. of Germany . |
| 2070414 | 9/1981 | United Kingdom . |

*Primary Examiner*—Richard A. Bertsch
*Attorney, Agent, or Firm*—Young & Thompson

[57] ABSTRACT

An upper anchorage for a shoulder belt of a vehicle seat belt system comprises a plate-like carriage slidable within a generally tubular upright track having a longitudinal slot through which a support for the belt outwardly projects. An arm or arms pivoted on the carriage, or a spring loaded detent projecting therefrom, normally engage in recesses in a wall or walls of the tubular track. The carriage can then quite readily be moved at least upwardly as desired. When a predetermined tension is experienced by the belt the support moves to cause the or each arm to be moved into, or further into, the recess, or, if only upward movement is normally permitted, the support can be moved upwardly on the carriage to allow adjustment downwardly.

23 Claims, 12 Drawing Figures

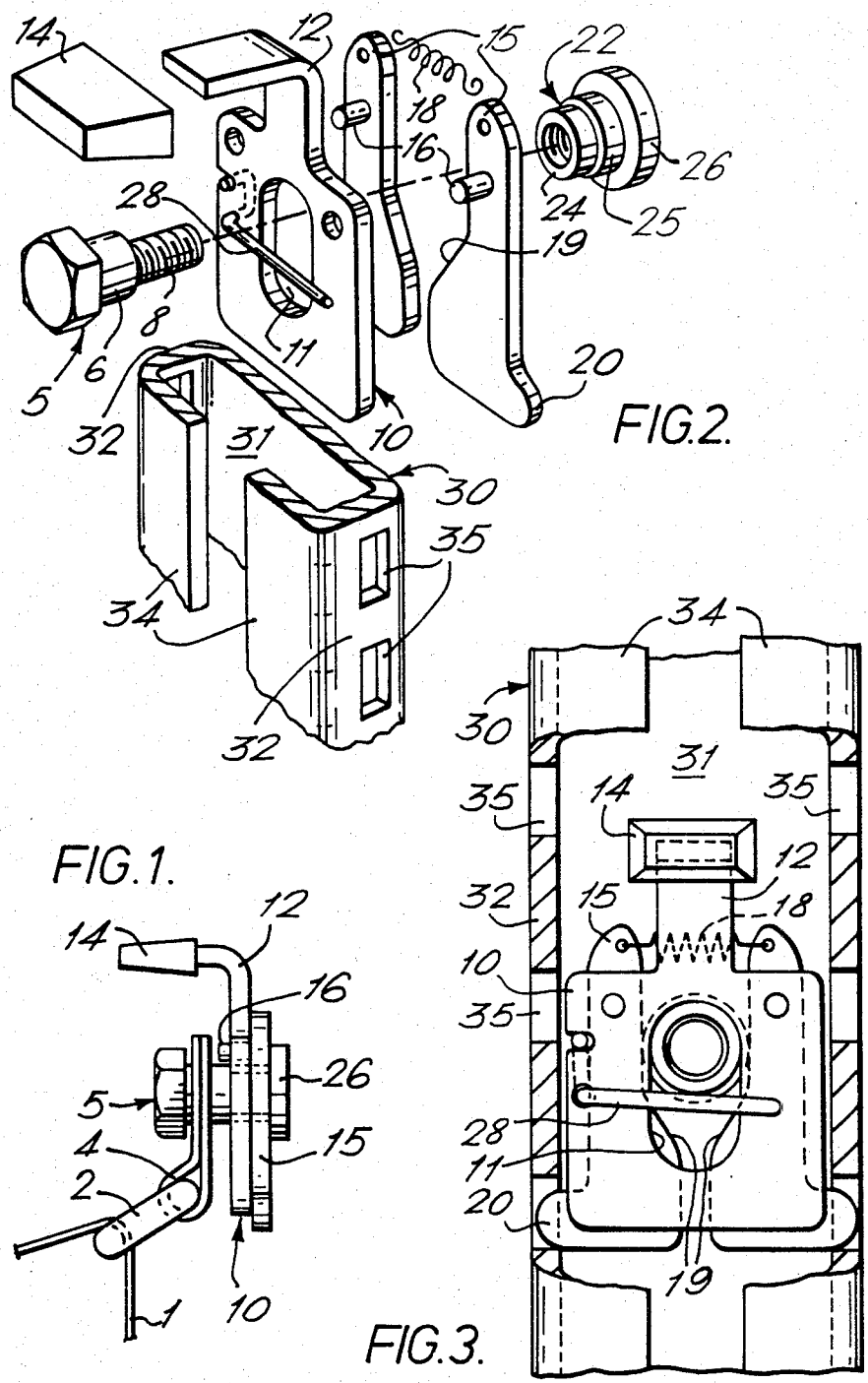

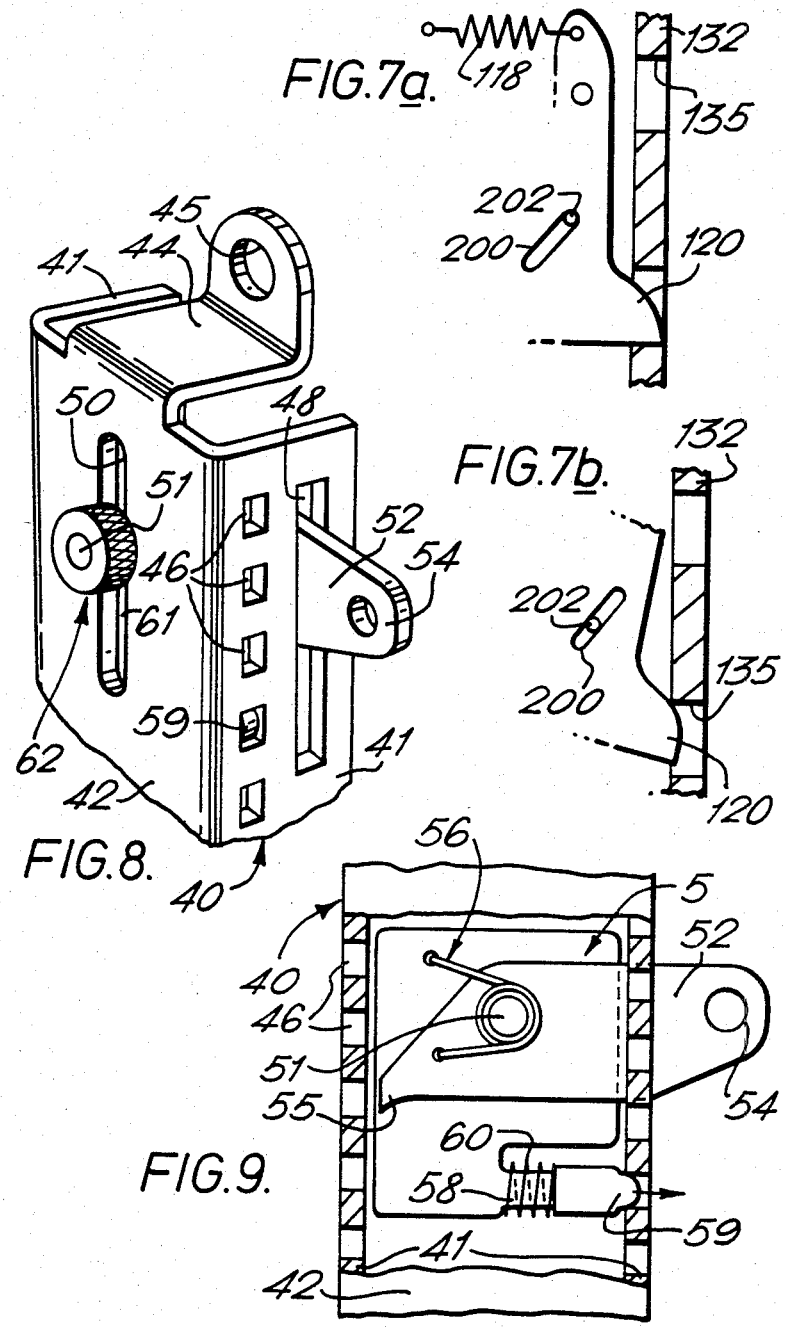

ADJUSTABLE SEAT BELT ANCHORAGE

BACKGROUND OF THE INVENTION

The invention relates to adjustable anchorages for seat belts such as are employed in vehicles, particularly road vehicles, for the protection of the occupants.

The invention relates particularly but not exclusively to an adjustable anchorage for the upper end of the shoulder belt of a vehicle seat belt system. The shoulder belt extends in use diagonally downwards from the anchorage across the torso of the user and may have one end secured to the vehicle by way of the anchorage. Alternatively, the belt may extend to the anchorage from a retractor, the anchorage providing a loop or slot through which the belt is guided.

It is an object of the present invention to provide an adjustable shoulder anchorage which is simple for the user to operate.

It is a further object of the invention to provide an adjustable shoulder anchorage which is readily manufactured and is reliable in operation.

SUMMARY OF THE INVENTION

The invention provides an adjustable shoulder anchorage in which
 a support for the belt is mounted on a carriage for movement in response to a predetermined tension in the belt, the carriage means being guided on a track,
 and a latch on the carriage is engageable with the track to oppose the movement of the carriage,
 movement of the support relative to the carriage being adapted to enhance the engagement of the latch with the track.

Preferably, the track has a plurality of latch configurations spaced therealong, in the form of opposed recesses in the side walls of a channel member constituting the track, and the latch is spring biassed to engage in an adjacent recess.

The latch and the latch configurations can be shaped to permit ratcheting of the latch along the track during said movement of the carriage in the absence of tension in the belt.

The latch can comprise two arms pivoted on the carriage with the support located between them, the arms being so shaped that the movement of the support means cams the arms outwardly into enhanced engagement with the track recesses.

The support can be manually movable relative to the carriage in a direction other than the direction of movement in response to the predetermined belt tension to move the latch to free the carriage for movement as the user desires. Where the latch means comprises two arms pivoted on the carriage, a pin and slot mechanism can be operative between the support and the arms to effect inwards pivoting of the arms in response to this manual movement.

The latch means can instead comprise a first element permanently biassed to engage an adjacent latch recess to oppose but not prevent movement of the carriage and an arm normally spaced from the track but engageable with a latch recess on the movement of the support under the belt tension.

The first latch element can comprise a spring-urged detent pin, or a spring-biassed arm pivoted on the carriage.

BRIEF DESCRIPTION OF THE DRAWINGS

Embodiments of the invention will now be described by way of example with reference to the drawings, in which:

FIG. 1 is a side view of a belt support assembly forming part of a first vehicle seat belt shoulder anchorage embodying the invention;

FIG. 2 is an exploded perspective view of the assembly of FIG. 1 and of a track in which it is received;

FIG. 3 is a part-sectional front view with parts removed of the assembly received within the track.

FIGS. 7a and 7b are section views of parts of the anchorage shown in FIGS. 4 to 6 in operation;

FIG. 8 is a perspective view of a third such anchorage embodying the invention;

FIG. 9 is a front view of the anchorage of FIG. 8, shown partly broken away to reveal the interior;

Figure 5:
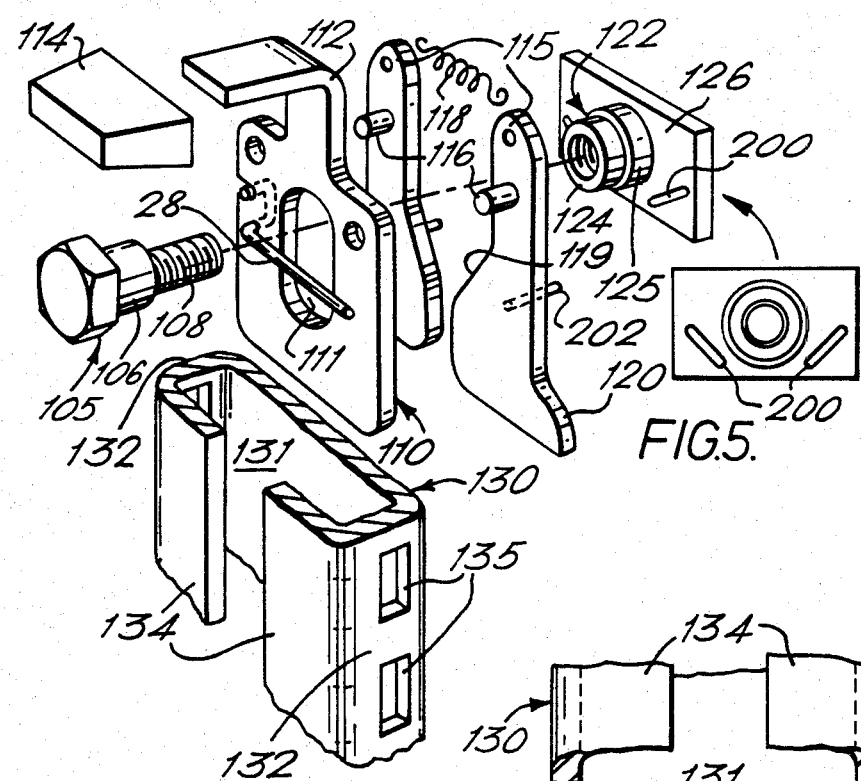
FIGS. 4 to 6 are views corresponding to those of FIGS. 1 to 3 of a second anchorage embodying the invention.

The seat belt 1 shown in FIG. 1 extends upwardly from an emergency locking retractor (not shown) through an elongate metal loop 2, and then diagonally downwards across the torso of the wearer. The loop 2 is held with its plane inclined to the horizontal by means of a metal bracket 4 consisting of a metal plate folded around the upper longer side of the loop and secured thereto, the doubled over portion of the bracket being apertured to receive therethrough a headed bolt 5 with a plain shank portion 6 and a threaded free end 8.

The bolt 5 forms a part of the belt support assembly which comprises also a carrier slide 10 having a generally rectangular portion with a central upright elongate slot 11 (FIG. 2), and an upper extension portion 12 the free end of which is bent forwardly to receive thereon a knob 14 by which the assembly can be manipulated.

A pair of lockbars 15 are pivotally connected to the slide 10, rearwardly of the knob 14, each lockbar comprising a plate with a pin 16 projecting into an aperture in the slide 10 to afford the pivotal connections. Above the pivotal connections, the two lockbars 15 are apertured for connection together by a tension spring 18, and below the pivotal connection, the lockbars widen out towards each other over inclined ramp portions 19. At its lower end, each lockbar 15 has a laterally outwardly extending pawl portion 20.

An actuator 22 of stepped circular cross-section has small diameter end portion 24 which is centrally tapped to receive the threaded shank 8 of the bolt 5. The end portion 24 abuts the end of the bolt portion 6 and is received in the elongate slot 11 of the frame 10. An intermediate portion 25 of the actuator, of larger diameter, is received between the upper portions of the lockbars 15, and an end portion 26 of larger diameter still, bears against the rear sides of the lockbars to retain them in assembly with the frame 10. One side edge of the slide 10 has a notch and an aperture by means of which a spring 28 is mounted so as to act on the underside of the bolt portion 8, to urge this and the actuator 25 upwardly in the slide 10, so that the portion 25 is above the lockbar ramp portions 19.

The belt support assembly is received within an elongate metal track 30 (FIGS. 2 and 3) comprising a rear web 31 and side webs 32 from which front webs 34 extend parallel to the rear web to spaced apart edges. The front webs 34 trap the assembly within the track, and through the slot between them the bolt 5 and the knob 14 outwardly project. Apertures 35 in the side webs 32 are spaced apart along the length of the track and are arranged in transversely opposed pairs.

The belt support assembly is received within the track 30, with the lockbar pawl portions 20 normally extending in an opposed pair of the apertures 35 to hold the assembly in position. The actuator 22 is urged by the spring 28 into the upper end of the slot 11, and in this condition, the assembly can be freely ratcheted up or down along the track, the knob 14 being manually grasped to effect the movement. The pawl portions 20 have rounded edges shaped so that they can readily ride out of the side web apertures 35 at the start of this movement against the force of the tension spring 18, which however causes them to enter each opposed pair of the apertures as they come into adjacency with them.

The belt support assembly is thus normally held in position in the track 30 in a manner readily permitting movement. However, as soon as a downward force is applied to the bolt 5, as by tension in the belt 1 acting through the elongate loop 2 and bracket 4, the intermediate actuator portion 25 moves downwardly in the frame slot 11, against the spring 28, and in doing so, it acts on the ramp portions 19 of the lockbars 15, to force the pawl portions 20 outwardly into the apertures 35 so that the assembly is very firmly latched against movement in the track.

The belt support assembly can thus normally be moved fairly freely up and down the track 30, but is immediately and automatically locked in position when tension is applied to the belt 1, as would occur under emergency conditions, when the belt is restraining its wearer against forward movement from his seat.

The second embodiment shown in FIGS. 4 to 7 will now be described. Parts of the second embodiment corresponding to parts of the first embodiment are indicated by reference numerals increased by 100.

Figure 4:
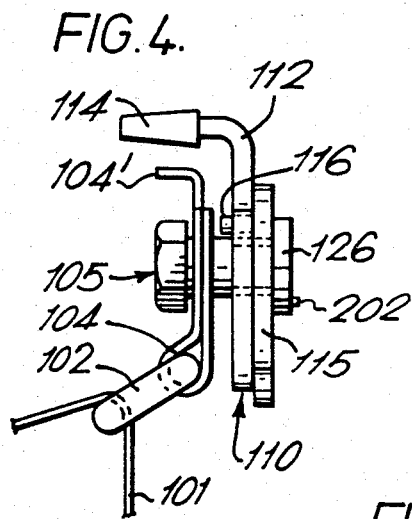
Figure 6:
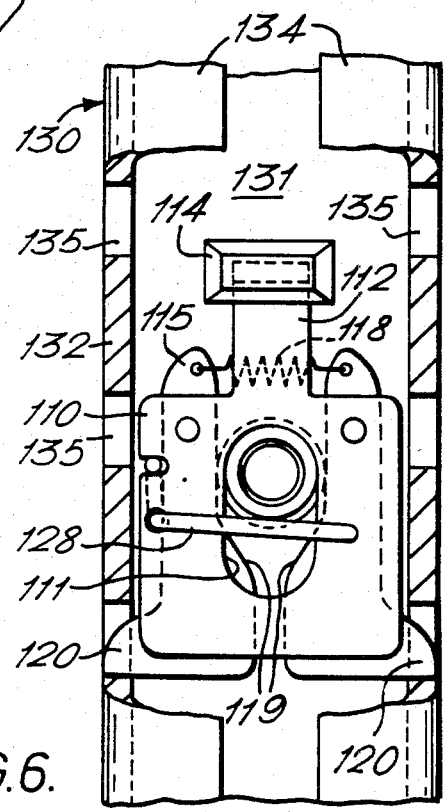

FIG. 4 corresponds closely to FIG. 1 and will not be described in detail except to say that the metal bracket 104 of this second embodiment differs from the bracket 4 of FIG. 1 in having an outwardly turned extension portion 104' above the bolt 105 and generally parallel with the knob 114. Alternatively, this extension portion 104' could be formed on the bolt 105, on a loop cover, or on any other suitable component in this area.

In a manner similar to the first embodiment, the second embodiment includes a pair of lockbars 115 having pins 116 projecting into apertures in the slide 110 to provide the pivotal connections, a tension spring 118, and, on the lockbars 115, inclined ramp portions 119 and pawl portions 120.

An actuator 122 of the second embodiment comprises a head portion 126 of generally rectangular shape, an intermediate cylindrical portion 125, and a small diameter end portion 124 which is centrally tapped to receive the threaded shank 108 of the bolt 105. The end portion 124 abuts the end of the bolt portion 106 and is received in the elongate slot 111 of the slide 110. The intermediate portion 125 of the actuator is received between the upper portions of the lockbars 115. The rectangular head portion 126 bears against the rear sides of the lockbars 115 to retain them in assembly with the slide 110.

Two slots 200 are provided in the head portion 126 of the actuator 122, one on each side of the intermediate portion 125 and angled as shown in FIG. 5. Two pins 202 extend rearwardly one for each lockbar 15. These pins 202 are located respectively one in each of the slots 200.

The belt support assembly is received within an elongate metal track 130 comprising a rear web 131, side webs 132 from which front webs 134 extend parallel to the rear web and terminating in spaced edges. The front webs 134 trap the assembly within the track, and through the slot between them the bolt 105, the loop extension 104' and the knob 114 project outwardly. Apertures 135 in the side webs 132 are spaced along the length of the track and are arranged in transversely opposed pairs.

With this second embodiment the locking members, i.e. the lockbars 115, are always latched except when one is manually adjusting the anchorage. In the normal position, i.e. the resting position, when the seatbelt is being worn, the lockbars 115 are latched into the slots 135 in the track, as shown in FIG. 7a. In this position the pins 202 on the lockbars 115 are positioned at the top of the two slots 200. It should also be noted that the sides of the head portion 126 of the actuator 122 locate on the inside faces of the side webs 132 of the track 130. This prevents rotation of the actuator 122 relative to the assembly.

If one wishes to raise the belt support assembly relative to the track, then an upward movement of the running loop 102 and bracket 104, which are connected to the sliding components, causes the pins 202 to be urged down the slots 200 towards the position shown in FIG. 7b. As this happens so the pawl portions 120 of the lockbars 115 are withdrawn from engagement with the slots 135 (FIG. 7b). This also causes the spring 118 to be tensioned. The disengagement of the pawls 120 from the slots 135 is aided by rounding the top corner of the pawls so that they then "roll over" the adjacent upper edge of the slot 135. The lower portion of each pawl 120 is formed with a sharply defined edge for definite latching engagement of the pawl in the slot. Once the pawls are disengaged from the slots the belt support assembly can be moved up the track to another setting.

In order to adjust the belt support assembly downwards relative to the track, one simply manually pinches together the knob 114 and the extension piece 104'. The action of pinching these components together has the effect of again camming the pins 202 down the slots 200, thus forcing the lockbars 115 out of engagement. The assembly can then be lowered to the desired new setting. The lockbars 115 are then re-engaged due to the action of the tensioned spring 118.

Advantageously, the slots 200 extend upwardly beyond the position of pins 202 shown in FIG. 7a so that a predetermined tension in the belt can cause downward movement of the belt support assembly relative to the slide 110, so that the lockbars 115 are urged outwardly by action of the portion 125 on the ramp portions 119, and the pawl portions 120 are urged further into the recesses 135.

In the third embodiment shown in FIGS. 8 and 9, the track 40 is channel shaped, the side webs 41 extending from the front centre web 42 towards the door pillar to which the track is secured by one or more inwardly bent extension portions 44 of the centre web, apertured at 45 to receive a bolt or other fastener. The side webs 41 are provided with rows of apertures 46 and one side web has a longitudinal slot 48 parallel to the row of apertures and nearer than the row to the free edge of the web.

The carrier slide 50 has the form of a plate, received within the track parallel to and adjacent the front web 42, on which is pivoted, by way of a pin 51, a lever 52 having an apertured end 54 projecting outwardly of the track through the slot 48 and an opposed end 55 formed as a tooth. A spring 56 received around the pivot pin has a respective areas engaging the lever and the slide end urges the lever into the position shown in which the toothed end 55 is spaced away from the apertures in the adjacent side web 41. The apertured end 54 of the lever carries a running loop (not shown) for the belt. A cutout towards the lower edge of the slide defines an arm 58 on which is carried a ball catch having a detent element 59 urged by a spring 60 to releasably enter the apertures in the adjacent side web 41.

In the normal position shown, the spring 56 holds the toothed end 55 of the lever 52 clear of the side web apertures but a sufficient pull transmitted through the belt to the lever overcomes the spring force so that the lever is securely locked to the track by engagement of the toothed end into one of the side web apertures. The spring 60 applies force to the detent element 59 to retain the slide 50 in the position along the track to which it has been set. The slide 50 can however be moved manually along the track by means of a portion, conveniently constituted by an extension of the pin 51, projecting outwardly through a longitudinal slot 61 in the front web 42. This portion of the pin 51 can be threaded for reception of a lock nut 62, so that the slide can be releasably retained in the selected position by tightening the nut against the front web. The ball catch serves to locate the slide 50 so that the toothed end 55 is correctly positioned to engage the side web apertures 46.

Figure 10:
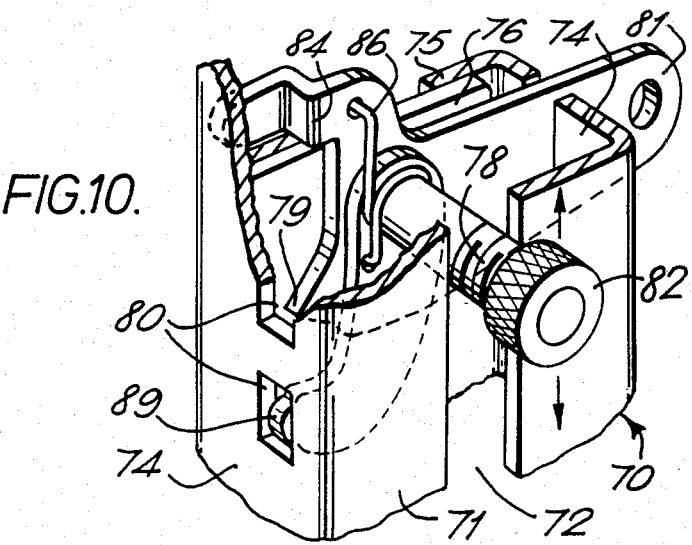
FIG. 10 is a partial perspective view of a fourth such anchorage embodying the invention.
Figure 11:
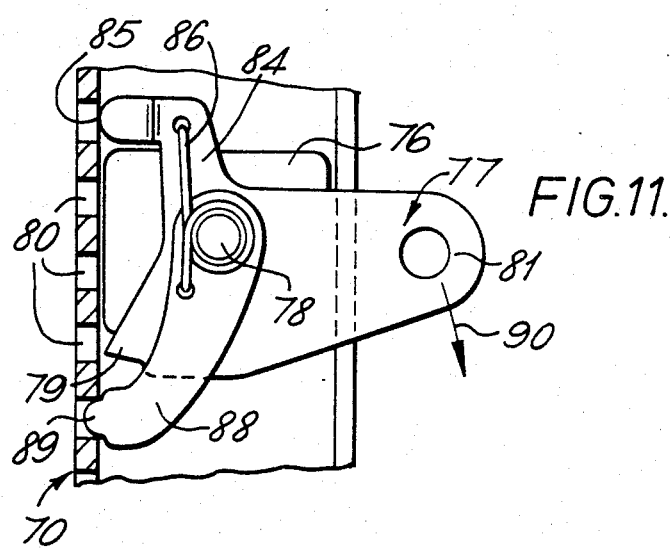
FIG. 11 is a front view of the anchorage of FIG. 10, again shown partly broken away.

In the fourth embodiment shown in FIGS. 10 and 11, the track 70 has a front web 71 with a longitudinal slot 72, side webs 74, and rear webs 75 turned towards each other. A platelike carrier slide 76 moves along the track against the rear webs 75 and pivotably carries a lever 77 by means of a pivot pin 78. The lever 77 has a toothed end 79 engageable in spaced side web apertures 80, and an apertured end 81 projecting outwardly of the track 70 through a slot in the other side web 74 to support the seat belt. The pivot pin 78 has a threaded end portion projecting outwardly through the front web slot 72 for reception of a lock nut 82 or other releasable fastener for clamping the slide 76 in a selected position along the track.

The lever 77 is normally held in the inoperative position shown by an upper arm portion 84, the free end 85 of which bears against the side web 74 with the row of apertures 80 under the urging of a two-armed spring 86 received on the pin 78. The arm portion 84 is cranked so that the free end portion 85 engages the side web alongside the apertures 80. The spring 86 acts with its other arm not on the slide 76 but on a detent lever 88 pivoted on the pin 78 and having a detent end portion 89 received in the apertures 80 to correctly locate the slide 76 for engagement of the toothed end 79 into one of these apertures when a sufficient pull is experienced on the lever 77, typically in the belt direction indicated by the arrow 90.

It is evident that those skilled in the art may make numerous modifications of the specific embodiments described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. Adjustable anchorage means for a seat belt system, said adjustable anchorage means comprising:
   carriage means
   support means for a component of said seat belt system and mounted on said carriage means for movement relative thereto from a first position in response to a predetermined load applied to said component,
   track means guiding said carriage means for movement of said carriage means along said track means in order to adjust the position of said carriage means relative to said track means,
   latch means on said carraige means and engaging said track means in said first position of said support means to oppose said movement of said carriage means, and
   means responsive to said movement of said support means relative to said carriage means to enhance said engagement of said latch means with said track means.

2. The anchorage means of claim 1 wherein the support means is adapted to receive the upper end of the diagonal run of a vehicle seat belt.

3. The anchorage means of claim 1 including resilient means biasing said latch means into said engagement with said track means.

4. The anchorage means of claim 3 wherein said track means has a plurality of latch configurations spaced therealong and wherein said biasing means is arranged to bias said latch means to engage with an adjacent latch configuration.

5. The anchorage means of claim 4 wherein said latch means comprises at least one arm pivoted on said carriage means and having an end portion and wherein said latch configurations comprise apertures in a wall of said track means into which said end portion can project.

6. The anchorage means of claim 4 wherein said latch means and said latch configurations are adapted to permit ratcheting of said latch means on said latch configurations during said movement of said carriage means when said support means is in said first position.

7. The anchorage means of claim 6 wherein said track means has a plurality of latch configurations spaced therealong and wherein said latch means comprises first means permanently biassed to engage an adjacent latch configuration to oppose but not prevent said movement of said carriage means and second means engageable with a latch configuration on said movement of said support means from said first position to prevent said movement of said carriage means in at least one direction.

8. The anchorage means of claim 7 wherein said first and second latch means are so positioned that said engagement of said first latch means locates said carriage means for precise engagement of said second latch means with a latch configuraiton.

9. The anchorage means of claim 7 wherein said first latch means comprises a spring-urged detent pin.

10. The anchorage means of claim 7 wherein said first and second latch means comprises spring-biased arms pivoted on said carriage means.

11. The anchorage means of claim 7 wherein said support means is pivoted on said carriage means and said second latch means comprises an end portion of said support means.

12. The anchorage means of claim 7 further comprising means whereby said carriage means can be selectively clamped to said track means.

13. The anchorage means of claim 4 wherein said latch means comprises two arms pivoted on the carriage means with said support means therebetween, said arms being so shaped that said movement of said support means from said first position cams said arms outwardly into enhanced engagement with said track means.

14. The anchorage means of claim 13 further comprising spring means opposing said movement of said support means from said first position.

15. The anchorage means of claim 4 wherein said engagement of said latch means with said adjacent latch configuration prevents said movement of said carriage means in at least one direction and wherein said support means is manually movable relative to said carriage means in a direction other than the direction of said movement in response to said predetermined load to thereby effect movement of said latch means to permit movement of said carriage means in said at least one direction.

16. The anchorage means of claim 15 wherein said latch means is pivoted on said carriage means and wherein said manual movement of said support means cams said latch means from the engagement with the track means.

17. The anchorage means of claim 15 wherein said latch means comprises two arms pivoted on said carriage means with said support means therebetween, and wherein a pin and slot mechanism is operative between said support means and said carriage means to effect inwards pivoting of said arms in response to said manual movement of said support means.

18. The anchorage means of claim 4 wherein said track means comprises opposed parallel side walls, spaced apertures in said side walls, and a front wall having a longitudinal slot, wherein said carriage means comprises a plate member slidably guided by said front and side walls and having a slot extending parallel to said front wall slot, wherein said latch means comprises two plate-like arms pivoted on said plate member and having free ends, and spring means biassing said arms to urge said free ends into said side wall apertures, and wherein said support means extends through said front wall and carriage slots and has a portion received between said arms, said support means and said arms being co-operatively shaped whereby said support means has a position along said plate member slot in which said arm free ends are additionally urged into said side wall apertures.

19. Upper anchorage means for a shoulder belt of a seat belt system, said anchorage means comprising:
carriage means,
track means slidably guiding said carriage means for upwards and downwards movement therealong,
support means for said shoulder belt,
means slidably guiding said support means for upwards and downwards movement of said carriage means,
a plurality of latch recesses spaced along said track means,
latch means movably mounted on said carriage means and biassed to engage in an adjacent one of said latch recesses to thereby prevent at least downward movement of said carriage means, and
co-operating means on said support means and on said latch means whereby an upward movement of said support means on said carriage means said latch means is moved to permit said downward movement of said carriage means.

20. The upper anchorage means of claim 19 wherein said latch means are shaped to permit upward movement of said carriage means by movement against said bias without said upward movement of said support means on said carriage means.

21. The upper anchorage means of claim 19 wherein said support means is movable on said carriage means from an intermediate position, in which said downward movement of said carriage means is prevented by engagement of said latch means and said adjacent latch recess, by said upward movement to a second position and by a downward movement to a third position in which said engagement of said latch means and said adjacent latch recess is enhanced.

22. Adjustable anchorage means for a seat belt system, the adjustable anchorage means comprising:
carriage means,
track means slidably guiding said carriage means for movement therealong in first and second opposite directions,
support means on said carriage means for a component of a vehicle seat belt system,
means slidably guiding said support means for movement on said carriage means in said first and second directions,
a plurality of latch recesses spaced along said track means,
latch means movably mounted on said carriage means and biassed to engage in an adjacent one of said latch recesses to thereby prevent movement of said carriage means on said track means in at least said first direction and
co-operating means on said support means and on said latch means whereby, upon movement of said support means on said carriage means in said second direction, said latch means is moved to permit said movement of said carriage means in said first direction.

23. The anchorage means of claim 22 wherein said latch means comprises two arms pivoted on said carriage means with said support means therebetween, wherein said latch recesses are arranged in pairs with the recesses of each pair being in opposite longitudinal edges of said track means, and wherein a pin and slot mechanism is operative between said support means and said carriage means to effect inwards movement of said arms in response to said movement of said support means in said second direction.

* * * * *